United States Patent
Konoplev et al.

(10) Patent No.: US 8,879,804 B1
(45) Date of Patent: Nov. 4, 2014

(54) SYSTEM AND METHOD FOR AUTOMATIC DETECTION AND RECOGNITION OF FACIAL FEATURES

(76) Inventors: Alexey Konoplev, St. Petersburg (RU); Yury Volkov, St. Petersburg (RU)

(*) Notice: Subject to any disclaimer, the term of this patent is extended or adjusted under 35 U.S.C. 154(b) by 163 days.

(21) Appl. No.: 13/328,523

(22) Filed: Dec. 16, 2011

Related U.S. Application Data (60) Provisional application No. 61/424,632, filed on Dec. 18, 2010.

(51) Int. Cl.
*G06K 9/00* (2006.01)

(52) U.S. Cl.
USPC ............ 382/118; 382/159; 382/190; 382/209

(58) Field of Classification Search
USPC .................................. 382/159, 118, 190, 209
See application file for complete search history.

(56) References Cited

U.S. PATENT DOCUMENTS

| | | | |
|---|---|---|---|
| 6,633,655 B1* | 10/2003 | Hong et al. .................. 382/118 |
| 7,123,783 B2* | 10/2006 | Gargesha et al. ............. 382/308 |
| 2004/0213454 A1* | 10/2004 | Lai et al. ...................... 382/159 |
| 2006/0204053 A1* | 9/2006 | Mori et al. ................... 382/118 |
| 2010/0008641 A1* | 1/2010 | Murabayashi ................ 386/54 |
| 2010/0205177 A1* | 8/2010 | Sato et al. .................... 707/737 |

\* cited by examiner

*Primary Examiner* — Kim Vu
*Assistant Examiner* — Michael Vanchy, Jr.
(74) *Attorney, Agent, or Firm* — Superior IP, PLLC; Dustin L. Call (57) ABSTRACT

A system, method and computer program product for automatically identifying coordinates of facial features in digital images. The facial images are detected and pupil coordinates are calculated. First, face identification method is applied. Then, the centers of the pupils are identified. The image is rotated, scaled and the portion of the image is cut out so that the pupils are located on the horizontal line and are located at fixed coordinates. Subsequently an original image with facial features can be identified.

9 Claims, 5 Drawing Sheets

SYSTEM AND METHOD FOR AUTOMATIC DETECTION AND RECOGNITION OF FACIAL FEATURES

CROSS-REFERENCE TO RELATED APPLICATION

This application claims priority of a Provisional U.S. Patent Application No. 61/424,632, filed on Dec. 18, 2010 incorporated by reference herein in its entirety.

BACKGROUND OF THE INVENTION

Field of the Invention

The present invention is directed to face recognition, and more particularly, to identifying coordinates of facial features in digital images.

Photographs have been historically used for personal identification. Human portraits have been always used on documents, such as passports, that were required for personal identification. Often, the human faces in photographs were recognized and corrected manually and corrections were made on the actual photographs or on negatives or films by hand. This was always a tedious process requiring special artistic skill. This process also required comparison of new and old pictures and the comparing the photographs to the actual face of a document holder.

With the arrival of a digital photography a need to compare facial images has become more apparent. However, automatic recognition of human faces within the digital images had become a problem. While numerous digital photo editor kits exist, such as Adobe Photoshop™, in order for these tools to work, the human faces need to be efficiently recognized first and then some specific facial features need to be compared for recognition.

Yet, depending on a photo editor used and a skill of the person using it, a face still looks more or less artificial on the portrait. In other words, the human face on a digital picture looks unnatural and it can be seen that the image was "doctored." These altered images are often referred to as having been "photo-shopped."

Most of these visually recognizable corrections to the image are caused by the manual nature of these corrections, for example, a user is trying to cover up a pimple on a digital image of a face. Typically, the user selects a color and a place where he wants to apply the color brush.

Therefore, the corrected image only looks as good as user's color perception and hand accuracy. Thus, an efficient automated recognition and correction of the human faces within the digital images is desired. However, this process is not possible without efficient recognition of images of the human faces first. Furthermore, it is important to recognize that a previously corrected facial image belongs to the same person. By determining a probability that the person whose face is analyzed is not the person with rights to access a particular resource, an efficient access protection system can be implemented.

Accordingly, there is a need in the art for a system and method that addresses the need for automatic recognition of facial images within the digital images and more particularly for identifying coordinates of facial features in digital images for efficient comparison.

SUMMARY OF THE INVENTION

The present invention is intended as a method and system for identifying coordinates of facial features in digital images that substantially obviates one or several of the disadvantages of the related art.

In one aspect of the invention there is provided a system, method and computer program product for automatically identifying coordinates of facial features in digital images. According to an exemplary embodiment, the facial images are detected and pupil coordinates are calculated. First, face identification method is applied. Then, the centers of the pupils are identified. The image is rotated, scaled and the portion of the image is cut out so that the pupils are located on the horizontal line and are located at fixed coordinates. Subsequently an original image with facial features can be identified.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
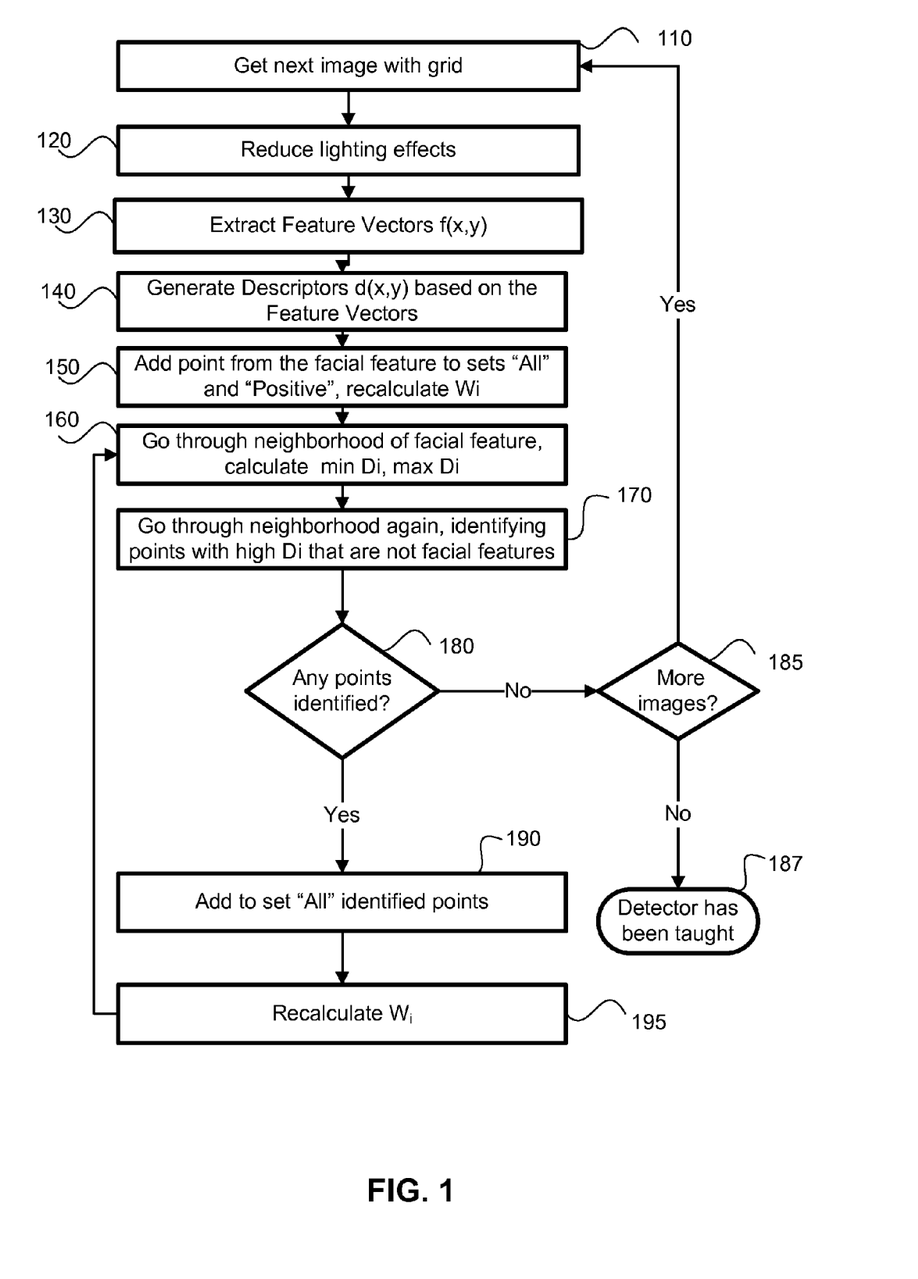
FIG. 1 illustrates the process of training of detector $D_i$ of ith facial feature in accordance to the exemplary embodiment.
Figure 2:
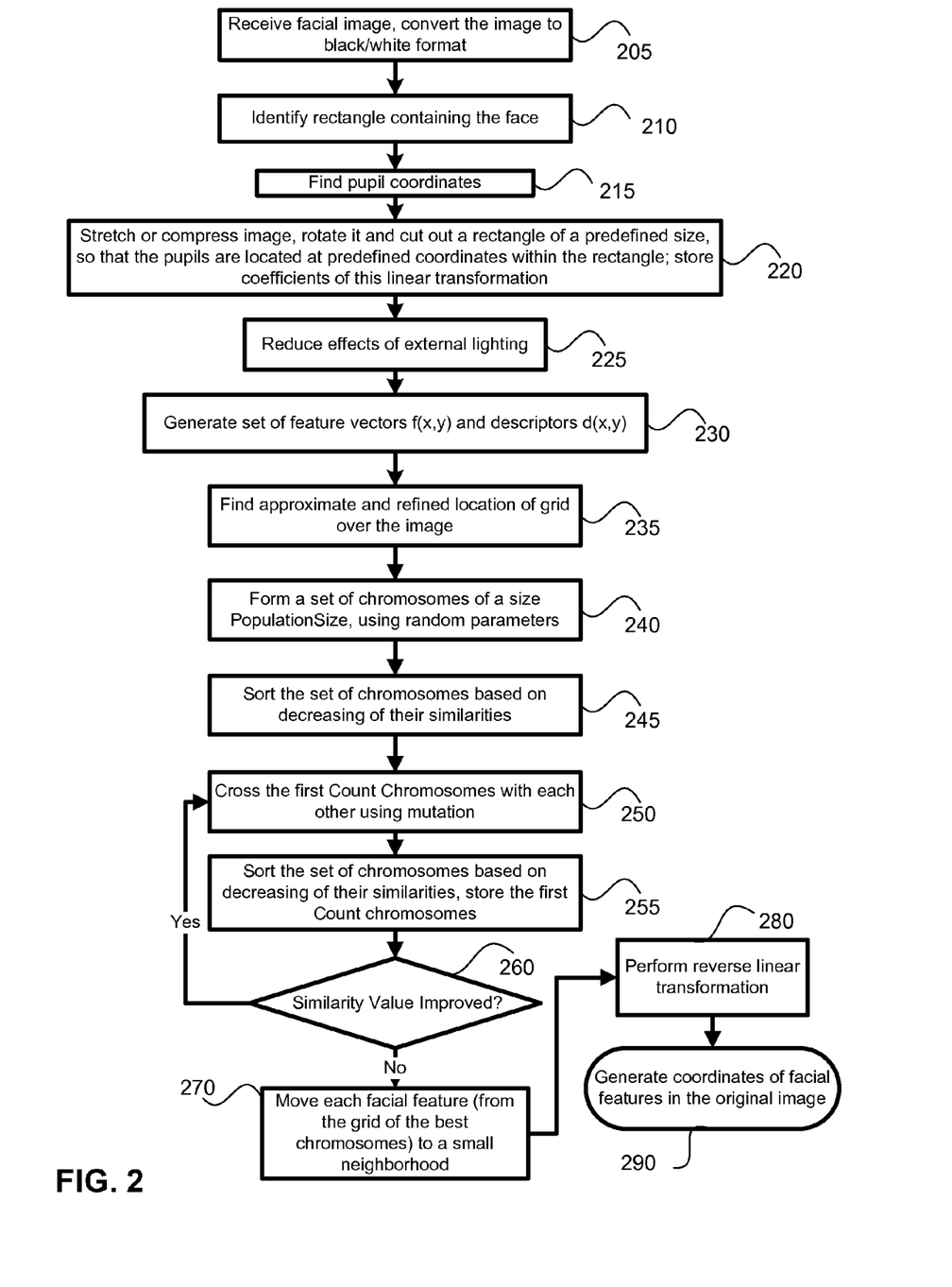
FIG. 2 illustrates the process of facial feature detection in accordance with the exemplary embodiment.

The exemplary embodiment is directed to three main aspects: a scheme of facial feature markup and description of a grid space; operation of a facial feature detector and the mechanism for training of the detector (see FIG. 1); and a mechanism for identifying facial features in digital images (see FIG. 2).

FIG. 1 illustrates the process of training of detector $D_i$ of ith facial feature in accordance to the exemplary embodiment. In step 110 an image with a grid is received. External lighting effects are reduced in step 120. Feature vectors are extracted from the image for all point with coordinates (x, y) in step 130. Descriptors are generated based on the feature vectors in step 140. Then, in step 150, points are added to All and Positive arrays and the weight is recalculated. Note that this process is discussed in detail below.

In step 160, neighborhood of facial features is scanned and maximum and minimum values of detector $D_i$ are calculated.

Then, the points with high $D_i$ value that do not belong to the facial features are identified in step 170. If such points are identified in step 180, the identified points are added to the All array in step 190 and the weight is recalculated in step 195. If no points have been identified in step 180, the process checks for more images. If more images are detected in step 185, the process goes back to step 110. However, if no more images are available, the detector training process stops in step 187.

FIG. 2 illustrates the process of facial feature detection in accordance with the exemplary embodiment. A facial image is received and converted into black and white format in step 205. A rectangle containing the face is identified in step 210. Pupil coordinates are determined in step 215. Then, in step 220, a rectangle of the pre-defined size is cut out from the image (that has been processed and rotated) so that the pupils are located at pre-defined coordinates within the rectangle. Coefficients of linier transformation are stored.

Effects of external lighting are reduced in step 225. Set of feature vectors and descriptors are generated in step 230. Approximate location of the grid over the image is found in step 235. In step 240, a set of chromosomes of specific size is formed using random parameters. The chromosomes are sorted based on decreasing similarities in step 245. First count chromosomes are crossed with each other using mutation in step 250. Then, in step 255, the chromosomes are sorted based on decreasing similarities. The first count chromosomes are stored.

If, in step 260, it is determined that the similarity value has improved, the process goes back to step 250, where the chromosomes are crossed again. However, if the similarity value has not improved in step 260, each facial feature is moved from the grid of the best chromosomes to a small neighborhood in step 270. Subsequently, reverse linear transformation is performed in step 280. Coordinates of facial features in the original image are generated in step 290. Note that this process is discussed in detail below.

Figure 5:
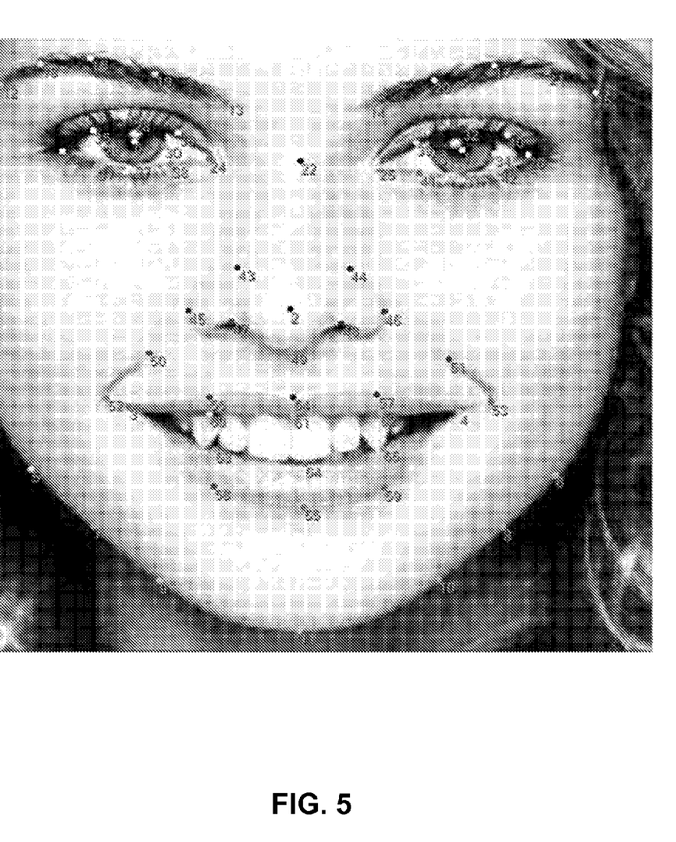
FIG. 5 illustrates the facial feature markup in accordance with the exemplary embodiment.

According to the exemplary embodiment, facial feature markup is implemented as follows. Coordinates of particular facial features in an image are identified. A special grid is overlaid over the image, and each identified facial feature is tagged with a numbered point. Any arbitrary number of such points can be used. The numbered points are located on different facial features, such as centers of pupils, eyebrows, contours of the mouth, etc. Each point is correlated to a particular facial feature. As one example, 66 points can be used as shown in FIG. 5. These points can be represented by a vector $F_i=(x_i,y_i)$, i=1, . . . N. In this example, N is 66.

According to the exemplary embodiment, a facial recognition algorithm is trained. For training, a set of images of faces is used. The images are marked with the points in advance. The training set of images needs to be large enough to have sufficient variation in the facial features. In other words, the set of facial images needs to represent faces of people of different ages, genders, ethnic groups, with and without glasses, from different angles, showing different emotions, under different lighting conditions, etc.

Each element from the set has a corresponding image I and coordinates of the face F (i.e., a grid). For convenience of processing, all the images I can be normalized to the same size (for example, all the images I can be 128×128 pixels), and the faces in the images have the same proportions (for example, the distance between the centers of the eyes, or between the line connecting the pupils and the horizontal line of the mouth is approximately the same in all the images in the training set).

In the process of identifying the facial features, a set of grids needs to be chosen. An optimum grid is selected so it overlays the features of the face in the best possible manner. An optimum grid that fits a particular face the best is selected using a concept of grid space.

Let Mean be the average vector for the set of vectors F. After transforming the vectors F using the principle component analysis (PCA) algorithm (T. F. Cootes, G. J. Edwards and C. J. Taylor. "Active Appearance Models", in Proc. European Conference on Computer Vision 1998 (H. Burkhardt & B. Neumann Eds). Vol. 2, pp. 484-498, Springer, 1998, http//personalpages.manchester.ac.uk/staff/timothy.f.cootes/Models/eccv98_aam.pdf a set of vectors $P_i$ is generated. Then, the set is reordered in decreasing order based on eigenvalues and the first K vectors are taken.

The number K is chosen either empirically or experimentally, for example, in one embodiment, K=32. Alternatively, K can be chosen so that the sum of eigenvalues, corresponding to the first K vectors, is a large enough percentage (95-99%) of the sum of all the eigenvalues, generated through the application of PCA.

Then, an arbitrary grid G can be described with some precision, as G approximately equals to Mean+Sum (alpha$_i$*P$_i$), i=1, . . . , K, alpha$_i\in$[−3*sqrt(Lamda$_i$); 3*sqrt(Lamda$_i$)], where Lamda$_i$ is an eigenvalue, corresponding to the vector $P_i$. Then, by varying the values of alpha$_i$ it is possible to generate arbitrary grids in the grid space. Each grid from the grid space represents a face. In other words, the locations of the points of the grid correspond to facial features of some face.

According to the exemplary embodiment, training of the facial feature detector is provided. To identify facial features, consider a detector $D_i(x, y)$ for each facial feature, where the ith detector $D_i$ identifies the ith facial feature. The detector $D_i$ is applied to the image I at the coordinate (x, y). The detector $D_i$ should output a high value if at the coordinate (x, y) there is an ith facial feature. If the ith facial feature is not detected, a relatively low value is outputted. In the ideal case, the detector $D_i$ outputs a maximum at the coordinates where the ith facial feature is located.

In most practical cases, this happens not for the entire face, but for some area close to the facial feature. According to the exemplary embodiment, each detector $D_i$ for each facial feature is trained based on the set of images and grids from the training set. For each image, the following steps are performed:

1. A small area is cut out from the image based on the given coordinates (the coordinates are the same for the entire set of images), so that the area contains the facial feature at issue with a high likelihood. This can advantageously reduce the number of calculations. For example, eyes can be detected based on a rectangle containing the eyes virtually in of the all the images. Note that for the facial feature detector a rectangle does not necessarily need to be cut out.

2. The original image, or the cut out area, is transformed to reduce the effect of the external lighting. The image $J_1$ is therefore generated.

3. The transformation including linear binary pattern (LBP) calculation is performed, generating the set $LBP_1(x, y)$, ... $LBP_n(x, y)$, which can be an empty set as well.

4. The transformation is performed generating the set $F_{i,q}(x, y)$. These functions are enumerated to obtain the set of functions $V_i(x,y), \ldots, V_m(x,y)$. Consider that all these functions belong to the range [0, 1]. If this is not the case, the function $V_i(x, y)$ is normalized to [0,1], i.e. it is replaced with $c*(V_i(x,y)+k)$ with constants k and c, such that the conditions min $V_i(x, y)=0$, max $V_i(x,y)=1$ are satisfied. Note that the Vi functions can contain the original image pixel values.

5. The sets generated previously represent the features of the image. Using these features, each point (x, y) can have corresponding feature vectors. In this case, such a feature vector is generated by concatenating the vectors ($LBP_i(x-7, y-7) \ldots LBP_i(x+7,y-7)$, $LBP_i(x-7,y-6) \ldots LBP_i(x+7,y+7)$) ($1 \leq i \leq n$) and the vectors $V_i(x-7,y-6) \ldots V_i(x+7,y+7)$) ($1 \leq i \leq m$).

The vectors from a neighboring area relative to the feature at issue are concatenated (for example, from the area 15×15). The size of the neighboring area can be chosen based on a compromise—the larger the size, the better the quality of the feature detection, however, it also means a greater amount of calculation.

Let the area of the neighboring region be equal to Z. In this case, Z=15×15=225. The resulting vector is referred to f. The ith element of the vector f, $i \leq Z*n$, is a number from the range $[0, N_i-1]$, where $N_i$ is the number of codes in the $LBP_i$ transformation. The other elements of the vector are real numbers from the range [0, 1].

If additional transformations are used (for example, filtering the image using another filters, convolutions, or wavelet transformations), the results of these transformations can be added to the feature vector by adding additional elements $V_i(x, y)$, and increasing the value of the constant m, while making sure that $V_i \in [0; 1]$. Thus, the feature vector can be of an arbitrary length.

The feature vector is constructed in such a way that it contains the most complete information about the image at the point (x, y), while maintaining a compromise between the completeness of the information and the processing speed of the detector. Let the vector f have a dimension Q=Z*(n+m).

6. At the desired points of the image, the vector f(x, y) of the dimension Q can be extracted, and a descriptor of a higher dimensionality can be constructed as follows. For each ith element of the vector f(x, y), $i \leq Z*n$ (the first Z×N elements of the vector), a vector $d_i$ of a dimension $N_i$ is constructed as $d_{ik} = \{k == f_i ? 1 : 0\}$, $k \in [1; N_i]$.

In order to generate the next Z×m elements, the interval [0, 1] is broken up into T intervals $[t_0,t_1], [t_1,t_2] \ldots [t_{T-1},t_T]$, where $0 = t_0 < t_1 < \ldots < t_T = 1$ is a previously defined set of numbers. For each $f_i$, $i > Z*n$, the vector $d_i$ of dimension T is constructed as follows: $d_{ik} = \{f_i \in [t_{k-1}, t_k] ? 1 : 0\}$, $k \in [1; T]$.

The division of the interval [0, 1] into T intervals can be done by dividing the interval either into equal size segments ($t_i = i/T$), or into different sized segments, for example, $t_i = (i/T)^{10/3}$, or by using some other exponent. Also, instead of a power function, some other monotonic function g can be used, which can be considered continuous for present purposes. This can be useful, if the distribution of the elements of the vector $f_i$ is non-uniform. Then, a partition of the [0; 1] interval into T intervals can be chosen in such a way that the probability of elements of $f_i$ that fall into each interval is approximately the same.

The number of intervals T can be selected based on how many examples of f from the training set are used. The greater the number of elements in the training set, the denser partition can be used. As one example, T=12 can be used. Then, the vector d (descriptor) is formed by concatenating the vectors $d_i$, i=1, ..., Q. Let the dimension of the vector d be equal to R. This dimension is several times larger than the parameter Q.

7. The detector of the ith facial feature $D_i$ works as follows: $D_i(x,y) = <w_i, d>$, where $w_i$ is a set of weights which is previously selected, d is the descriptor, based on f generated for the particular point (x, y). The dimension of $w_i$ equals to the dimension of d (and it equals to R). Note that, if the intervals are of the same size, such a scalar product can be calculated not by using R additions and multiplications, but by using a smaller number of additions (of the order Q) without multiplications as follows:

```
v=0
offset=0
for k=1 to Z*n {
  v=v+w[offset+f_k];
  offset=offset+Ni;
}
for k=Z*n+1 to Q {
  v=v+w[offset+(f_k)*T];
  offset=offset+T; }
```

Then v will contain the scalar product $<w_i, d>$. In the case where the interval [0, 1] is divided into non-equal intervals, but using a monotonic function g, the product is calculated in a similar manner, but the term $(f_k)*T$ is replaced with $g^{-1}(f_k)*T$. The reason for this is that in order to calculate the scalar product it is sufficient to sum only the weights having corresponding values in vector d that are equal to 1. The numbers of these coordinates are calculated based on the values of $f_k$.

The selection of the weights $w_i$ is done through the process of machine learning. To train the algorithm, two classes can be declared—a class of descriptors, taken exactly from the relevant facial feature (referred to this class as "features"), and a class of descriptors taken from all the other locations (this class is referred to as "non-features"). The training process is conducted such that $<w_i, d>$ is large when d∈Features, and $<w_i, d>$ is small in the other cases.

Since it is necessary to distinguish one class from the other, it can be said that a linear classifier is constructed in such a way that it outputs a value greater than 0 for the facial features and a value less than 0 otherwise. However, it is sufficient that the output value at the facial feature is larger than the output value in the neighborhood of the feature (but not on the feature itself).

8. A training set of descriptors d is formed, using the training set of faces and their grids. Two arrays are defined, "Positive" and "All", of a dimension R. Initially, their elements have a value 0. Two counters are also used, Positive-Count and AllCount, which are initially also set to 0. The initial values of all 0 are referred to as the "initial state." In a particular order, described below, the descriptors d are extracted from each successive image I (the image is taken from the training set of images), and are added to Positive array (element by element, Positive[i]<−Positive[i]+d[i]), if the coordinate from which the descriptor is extracted is close to $F_i$ of the corresponding image (in a special case, the value could be equal to $F_i$).

Also, in this case, the PositiveCount counter is increased by 1. Then, each extracted descriptor is added to the All array (also element by element), and the AllCount counter is also increased by 1. Thus, the descriptors extracted from the facial features are added to Positive array, and the descriptors extracted from anywhere are added to the All array. Positive-Count contains the number of descriptors extracted from the facial features, and the AllCount contains the total number of all the extracted descriptors.

9. The following describes how, by using the data in Positive array, in All array, PositiveCount and AllCount, the weights $w_i$ of the classifiers Di can be constructed. By using the Bayes Theorem, analogous to how bayesian spam filters use the Bayes Theorem, the following identity can be written:

$$w_{ik} = \log(\text{Positive}[k]) - \log(\text{PositiveCount}) - \log(\text{All}[k]) + \log(\text{AllCount}), \text{ if Positive}[k] > 0;$$

$$w_{ik} = -\log(\text{PositiveCount}) - \log(\text{All}[k]) + \log(\text{AllCount}), \text{ if Positive}[k] = 0, \text{ but All}[k] > 0;$$

$$w_{ik} = 0, \text{ if All}[k] = 0.$$

10. The following describes the process of extracting descriptors from the training set of faces and grids, in order to form the weights $w_i$ for the ith facial feature, based on points 8 and 9 above. Assume that in the beginning of the process, the initial state is given.

10.1 Taking the next image I from the training set, with a corresponding grid F. Apply the appropriate transformations discussed above to I, in order to generate the vectors f(x, y) and the descriptors d(x, y). Consider a region Omega, containing the ith facial feature $F_i$. For example, the region that is 32×32 can be taken, with $F_i$ in the center of the region. The descriptor d(x, y) is extracted based on the coordinate of $F_i$, and is added to the All array and the Positive array, based on point 8 (above), and the weights $w_i$ are formed based on point 9 (above).

10.2 The next step is to go through all the points of the region Omega, calculating the descriptors d and calculating the values $D_i$, as described earlier, using the weights $w_i$. The maximum and minimum values, max $D_i$, min $D_i$ are saved. Again, traverse region Omega, looking for points where $D_i$ gives sufficiently high values, relative to a point $F_i$, but which are far away from $F_i$. The descriptors from these points should be added to the All array (as described earlier), without adding anything to the Positive array, thereby reducing the output of the classifier.

Define threshold with a value between 0 and 1, for example, 0.3. In order to define points that have sufficiently high output at the detector, but do not represent the features of a face, the following criteria can be used:

(D, (x,y)>max $D_i$−(max $D_i$−min $D_i$)*threshold) AND ((x, y) is farther from $F_i$ by more than r pixels). The value of r can be equal to, for example, 6. However, instead of the first condition (before the AND operator), other conditions can be used, in order to define such points.

After adding the descriptor, the weights $w_i$ are calculated, according to the procedure in point 9 (above). If points that have sufficiently high output at the detector, but do not represent the features of a face, are identified, then the process described here starting from the beginning of point 10.2 is repeated. This process can either go on indefinitely, until such points are not found or can be repeated a finite number of times, for example, 10 times.

Note that this training scheme is not an absolute requirement in its exact form, and descriptors from the region Omega can be added in another order. In the simplest case, it is possible to add up all the descriptors from all the points in the region Omega.

By repeating the actions described in point 10.1 and point 10.2 all the images in the training set are processed. At the end of the process, weights $w_i$ of the detector $D_i$ are generated. Therefore, the detector, at this point, has been trained. To improve the training process, the procedure described in points 10.1 and 10.2 can be repeated several times, for example, the threshold can be increased (e.g., threshold equals 0.1 in the first time, and then twice with threshold that equals 0.3). Thus, with repeating iterations of the training, more and more strict conditions are applied for identifying facial features.

Note that the training of the detector, according to the exemplary embodiment, is performed online. Since the weight vectors $w_i$ are calculated using a relatively straightforward procedure immediately after the examples of descriptor d (belonging to a particular class) are extracted. There is no need to maintain the list of all previously seen examples of d to calculate the weights of the detector.

However, this is often the case in such methods of machine learning, such as Support Vector Machines, neural networks, or boosting methods (e.g., ADAboost, gentle boost), regression methods, etc. Since these more complex methods are not necessary, the described method works faster (only a single pass through the training set is necessary), and reduces the amount of memory needed (there is no need to store the entire training set of images in the memory—and this permits the use of much larger training sets). These are some of the advantages of the proposed method and system.

Note also that the training can also be done using alternative mechanisms, such as Support Vector Machines, neural networks, boosting methods and/or regression analysis. In this case, it would be necessary to store all the descriptors d, forming the training set for the ith facial feature. Also, the formation of the descriptor d(x, y) is not necessary, since for the training process f(x, y) can be used directly, instead of d(x, y).

However, the transformation of f(x, y) into d(x, y) using linear classifiers has advantages, since it transforms f(x, y) into a space of a larger dimension, and permits to obtain a non-linear classifier over f(x, y) using a linear classifier over d(x, y). Note that linear classifiers can be used instead of the non-linear classifiers, since they are simpler and are easier to calculate, while they have approximately the same recognition ability.

The use of a linear classifier typically reduces the length of time needed for the training process and the application of classifier. The use of descriptors is also one of the advantages of the proposed method. The operations described in point 10 (above) can be performed for each facial feature from the facial feature markup. Alternatively, in point 10.1, after applying the transformation described in items point 1-6 to the image I, a cycle that trains Di for each facial feature of the face on the image I can be launched.

This saves the time spent on the transformations described in points 1-6, by doing the transformations only once for each image. Otherwise, the transformations are performed for each image as many times as the number of facial features present in the markup.

Another method for training the $D_i$ detectors is the method of decision trees. The $V_i$ set is concatenated with the $LBP_i$ set, thus obtaining set $V_1(x, y), \ldots, V_{m+n}(x, y)$, representing all the features of an image I from the training set (collected as described above). Then, a set of attributes of I is constructed based on these features as follows:

$$A_\theta(I,x,y) = V_i(x+x_1, y+y_1) + \alpha V_j(x+x_2, y+y_2);$$

where θ=($x_1$, $y_1$, $x_2$, $y_2$, α, i, j)—the set of parameters describing the attribute, given that α∈[0, 1].

A decision tree includes split nodes and leaf nodes. A split node contains an attribute $A_\theta$ and a threshold τ. To get the output of a tree at the coordinate (x, y) of an image, $A_\theta$(I, x, y) is repeatedly evaluated starting from the root using the formula above, proceeding to left or right child node according to the comparison threshold τ (for example, to the left if $A_\theta$(I, x, y)<τ, and to the right otherwise).

At the leaf node reached in the tree, a learned probability that (x, y) is a desired facial feature, is stored. In the exemplary embodiment this procedure is called DecisionTreeOutput, which returns a Map(x, y) function, representing the probability that a desired facial feature is located at point (x, y). The DecisionTreeOtput therefore defines the Di(x, y) value.

According to the exemplary embodiment, the algorithm of training of a decision tree called DecisionTreeLearn is provided. The algorithm is similar to one described in V. Lepetit, P. Lagger, and P. Fua, "Randomized trees for real-time keypoint recognition," Proc. CVPR, pages 2:775-781, 2005. 4.

For the algorithm to operate, a set of examples is collected from the training set of faces and their grids. Each example is extracted at a coordinate (x, y) from a face, and is labeled as positive example, if it lies close enough to the desired facial feature and as negative example otherwise.

The examples can be collected from random coordinates of the training set, or at some specific coordinates (i.e., evenly covering the face or a neighborhood around the facial feature). Note that the training set can be expanded by rotating, scaling, and applying noise to each image in a training set (in a random or pre-defined manner). Thus, the set of examples Q={(I, x, y)} is formed.

A set of splitting candidates ϕ=(θ, τ) is defined (attribute parameters θ and thresholds τ). These parameters and thresholds can be chosen at random, or evenly across some particular grid, or τ is chosen from the partition of the [0; 1] range into T intervals $[t_{k-1}, t_k]$, k∈[1; T], as described above. For example, 2000 different attributes θ and 50 different thresholds τ can be chosen.

Partition the set of examples Q into left and right subsets by each ϕ:

$$Q_{left}(\phi) = \{(I,x,y) | A_\theta(I,x,y) < \tau\}$$

$$Q_{right}(\phi) = Q \setminus Q_{left}(\phi)$$

Compute the ϕ giving the largest gain in information:

$$\phi^* = \mathrm{argmax}_\phi G(\phi)$$

$$G(\varphi) = H(Q) - \sum_{s \in \{left, right\}} \frac{|Q_s(\phi)|}{|Q|} H(Q_s(\phi))$$

Where H(Q) is Shannon entropy (as described in S. Russell, P. Norvig, Artificial Intelligence: "A Modern Approach" (3d edition), pp. 703-704).

If the largest gain G(ϕ*) is sufficient, and the depth in the tree is below a certain maximum, then recourse for left and right subsets $Q_{left}(\phi^*)$ and $Q_{right}(\phi^*)$.

After the training is finished, one could prune a tree, as described in Russell above (pp. 705-706). Note that several trees (decision forest) can be trained on different subsets of examples. In this case, the DecisionTreeOutput procedure will compute the average of the output of each tree at the (x, y) coordinate.

According to the exemplary embodiment, a MeanShift procedure is used. The MeanShift employs a mean shift algorithm on Map(x, y) outputs to find the most probable coordinate of a facial feature, which is similar to one described in D. Comaniciu and P. Meer. Mean shift: "A robust approach toward feature space analysis," IEEE Trans. PAMI, 24(5), 2002. First, an iterative algorithm is defined to find mode starting with a coordinate (x, y). The algorithm calculates the new x and y coordinates as $$x' = \frac{\sum_{(i,j)\in\Omega} Res(i,j) * \exp\left(-\frac{(i-x)^2 + (j-y)^2}{b}\right) * i}{\sum_{(i,j)\in\Omega} Res(i,j) * \exp\left(-\frac{(i-x)^2 + (j-y)^2}{b}\right)},$$

$$y' = \frac{\sum_{(i,j)\in\Omega} Res(i,j) * \exp\left(-\frac{(i-x)^2 + (j-y)^2}{b}\right) * j}{\sum_{(i,j)\in\Omega} Res(i,j) * \exp\left(-\frac{(i-x)^2 + (j-y)^2}{b}\right)},$$

Where b is a bandwidth parameter estimated experimentally to yield the best results (for example, 3), and Ω is a neighborhood (for example, 17×17). We iteratively re-calculate x and y coordinates until convergence, and the resulting x and y defines a mode.

Then, the mode estimation algorithm is run from each (or some) points of the image, the mode for which the $$\sum_{(i,j)\in\Omega} Res(i,j) * \exp\left(-\frac{(i-x)^2 + (j-y)^2}{b}\right)$$

value is greater is selected. The coordinates of this mode define the result of the MeanShift procedure. To speed up the procedure, the iterations can be run from points where Res(x, y) is higher than a certain threshold, for example 0.7.

According to the exemplary embodiment the facial features are identified in the images. Below is a description of how all the coordinates of all the facial features can be found in an image. As a starting point, the detectors $D_i$ have been trained for each facial feature. As an input, an image $I_0$ is provided, and as an output, the coordinates of the facial features are generated.

By using any of the methods for face identification (for example, Viola-Jones), a rectangle containing the face is defined within the image. Then, the centers of the pupils are identified. The image is rotated, scaled and the portion of the image is cut out so that the pupils are located on the horizontal line and are located at fixed coordinates.

As an alternative, instead of identifying the centers of the pupils, it is possible to cut out a rectangle that is returned by the procedure that identifies the face and scales it down to some size while maintaining proportions, also to result in an image I of a specified size. For example, the image size can be 128×128.

The linear transformation of the original image $I_0$ is stored. Thus, once the coordinates of the facial features in the new (cut out) image are identified, the coordinates can be also restored in the original image. Then, applying, to the new image I, transformations described in points 2-6 (above), the vectors f(x, y) and the descriptors d(x, y) are generated. If the $D_i$ detector was trained using decision trees, the set of features $V_i(x, y)$ is generated instead.

During the next operations, a grid is placed over the image, and a measure of how well the grid matches the actual features on the face is calculated. The measure of similarity is calculated as a sum of all $D_i$, calculated at the coordinates at the ith point of the grid.

If the coordinates of some point of the grid fall outside of the edge of the image, then $D_i$ is calculated at the edge of the image. To speed up the calculation of $D_i$, the elements of descriptor d can be gathered from some neighborhood Z (for example a square of 48×48 pixels with the center in the mean position of ith point of the grid) and set not in neighborhood to the value of $D_i$, but in the nearest point of the neighborhood (or to the mean value of $D_i$ on some set of images). This requires less multiplications and additions in the algorithm calculating $D_i(x, y)=<w_i, d>$. If the neighborhood Z is too small, the acceleration occurs at the expense of quality.

Analogously, the calculation can be speed up by taking values of $D_i$ only in points with the even coordinates. If the $D_i$ detector was trained using decision trees, the $D_i(x,y)$ value is calculated as specified in the DecisionTreeOutput procedure.

The average grid (Mean) is placed over the image directly at the center of the image. The grid is then moved horizontally and vertically, by a predefined step, in order to identify an approximate location of the facial features. For example, the grid can be moved by 16 pixels to the left, right, top and bottom with a step of 4 pixels.

The position at which the maximum similarity occurs is stored. Then, an approximate position of the grid can be further refined by moving the grid horizontally and vertically with a smaller step. For example, the grid can be moved by 4 pixels to the left, right, top and bottom with a step of one pixel. Also, the position where similarity is the greatest is stored, and this position is saved as the starting position.

After that, a genetic algorithm is launched to refine the positions of facial features. This algorithm goes through different versions of the grid, beginning with a starting position, and returns a version of the grid that has the highest similarity.

The genetic algorithm operates with a set of chromosomes, and each chromosome stores a particular grid. At the start of the algorithm, a set of chromosomes (population) is formed. The size of this set (PopulationSize) can be, for example, 3000. Each chromosome in the set is initialized through a particular grid. Such a grid is generated based on a set of random parameters.

For example, the set of k numbers $Alpha_i$ discussed above, shifts along the axis X (Dx), shifts along the axis Y (Dy) changes of size along the axis X (Sx), changes of size along the axis Y (Sy), the angle of rotation around the center of mass (A) can be used. In this case, a total of k+5 parameters are used.

Based on these parameters, the grid is generated as follows: the grid is constructed using the starting position (which, in this case, performs the function of the vector Mean, discussed above), and k values Alpha, and is shifted by Dx, Dy, scaled by Sx, Sy relative to its center, and rotated by an angle A, also relative to the center. This set of parameters is chosen at random, within a certain range.

The first k parameters are chosen in the range from $-3*Sqrt(Lamda_i)$ to $3*Sqrt(Lamda_i)$, where $Lamda_i$ is the eigenvalue that corresponds to the ith parameter (see above). Alternatively, several parameters out of the k parameters (for example, first 15) can be specified in a given range, while the remainder can be specified in a more narrow range (for example, three times narrower). The shift parameters can be given randomly, for example, using a function with a Gaussian distribution, with a mean value of 0 and a standard deviation of 5.

The scaling can be given also with a Gaussian distribution with a mean value of 1 and a standard deviation of 0.2. The angle of rotation, in degrees, can also be given using a Gaussian distribution, with a mean value of 0 and a standard deviation of 10. The chromosomes for grid1 and grid2 can be crossed between each other, and in this case, a random number t is calculated from the range [0, 1], and the resulting grid is calculated as $t*grid1+(1-t)*grid2$. Alternatively, instead of crossing the grids, the parameters used to generate these grids can be crossed in order to avoid leaving the grid space.

If two grids are rotated by the angles $A_1$ and $A_2$, then crossing their parameters is analogous to rotating the grids by the angles $-A_1$ and $-A_2$, and then crossing the resulting grids, and then rotating the grid by the angle $t*A_1+(1-t)*A_2$.

A chromosome can mutate, in which case a random index i from 1 to k+5 is chosen. If $i<=k$, the ith eigenvector is added to the grid multiplied by some random number. Otherwise, the grid is either shifted or scaled, or rotated by some random angle, based on the selected index. If parameters are crossed, the mutation can be done not by adding a random number to a random parameter, but by replacing a random parameter with another random parameter (which permits not to leave the grid space). After the chromosome population is formed, the similarity is calculated for each chromosome (i.e., for its grid). The set of grids is sorted, based on similarity, in decreasing order.

Then, the first few chromosomes (Count) are selected from the sorted set, and then each of selected chromosomes is crossed with other selected chromosomes. Mutation is applied to the result, thereby producing a set of chromosomes of length Count*(Count−1). By adding to the generated set Count chromosomes used in a crossing, a new set of chromosomes, consisting of Count*Count chromosomes is generated. Typically Count is selected in such a way that the product Count*Count is several times greater than the PopulationSize.

Then, the obtained set is sorted, based on similarity, in decreasing order. The above described procedure is iterated several times. Each time the best similarity value is saved. A better similarity value will be generated with each iteration, and the process can stop either when it no longer improves the similarity, or after a finite number of iterations (for example, 10 iterations). The grid of a chromosome in the final population that has the highest similarity value is the output of the genetic algorithm.

As an alternative to genetic algorithm, an Active Shape Method (ASM) can be used. The average grid (Mean) is placed over the image directly at the center of the image. The grid is then moved horizontally and vertically, by a predefined step, in order to identify an approximate location of the facial features.

For example, the grid can be moved by 16 pixels to the left, right, top and bottom with a step of 8 pixels. Thus, the set of starting positions for ASM is generated. For each of these positions the optimal grid is obtained and the measure of correctness is determined. The optimal position corresponding to the maximum measure of correctness is taken as the result of ASM.

Let starting position be $S_0$. The following series of steps are performed. At the start of the jth step some position $S_{j-1}$ is determined (at the first step the process is at the starting position). For each feature i the point $(x_i, y_i)$ is found in some neighborhood of the ith point of $S_{j-1}$ with the maximum value of $D_i$ Alternatively, the result of the procedure Mean Shift applied to the function $D_i(x, y)$ as the point $(x_i, y_i)$ can be taken.

Based on these parameters the grid $S_j$ is generated as follows: the grid is constructed using the starting position $S_0$ and k values Alpha, and is shifted by Dx, Dy, scaled by Sx, Sy relative to its center, and rotated by an angle A, also relative to the center. The parameters are chosen in such a way that the distance between $S_j$ and the grid generated by points $(x_i, y_i)$ is minimal.

For the first k parameters some ranges are fixed and if one of the parameters falls out of corresponding range, the nearest value in the range is taken instead. For example, the range from $-Sqrt(Lamda_i)$ to $Sqrt(Lamda_i)$ can be taken for first 10 and the range $-0.5*Sqrt(Lamda_i)$ to $0.5*Sqrt(Lamda_i)$ can be taken for the remaining parameters. If $S_j$ coincides with $S_{j-1}$, $S_j$ is taken as the optimal grid and the sum of $D_i(x_i, y_i)$ as the measure of correctness.

After the genetic algorithm (or Active Shape Method) is completed, the coordinates of the facial feature F in a new (cut out) image I are produced. Additionally, each individual feature of the face can be moved within a certain neighborhood (for example, within a radius of 2-3 pixels). The process stops at a point in the neighborhood where the output of $D_i$ is at its maximum.

Figure 3:
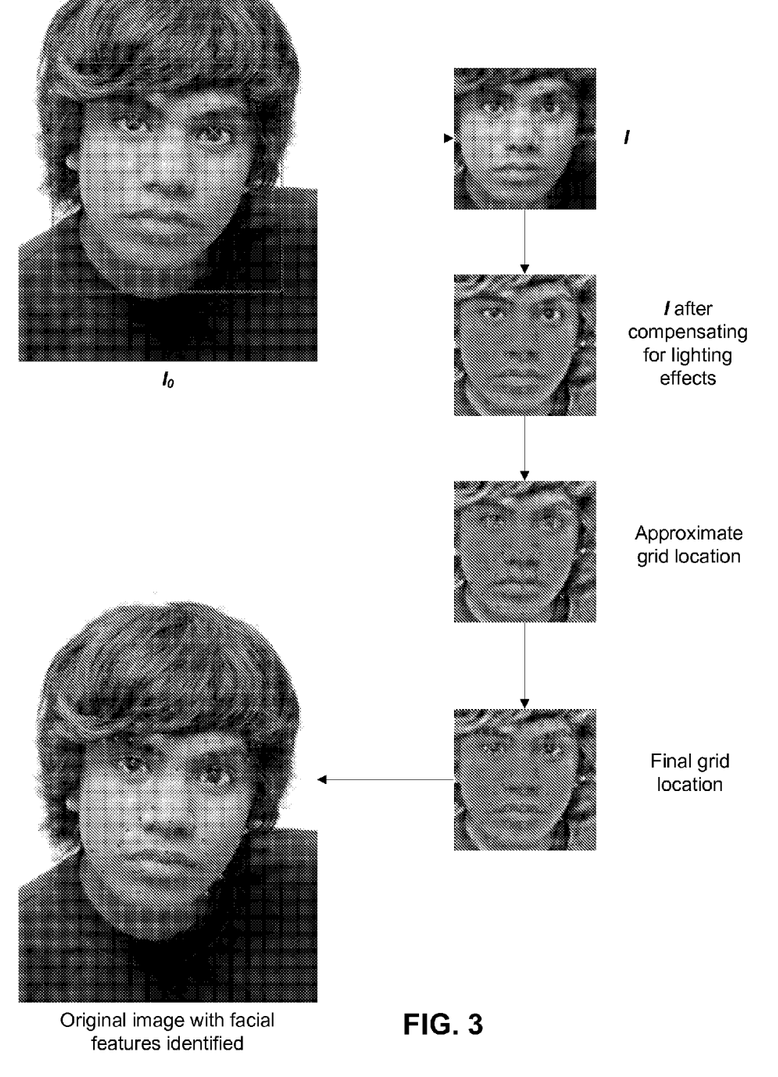
FIG. 3 illustrates the process of facial feature detection on a particular photo in accordance with the exemplary embodiment.

As a result a more refined location of the facial features F on the image I is obtained. If the linear transformation from the original image $I_0$ is stored into a new image I, then the coordinates of facial features can be identified in the original image as well. This is illustrated in FIG. 3.

Figure 4:
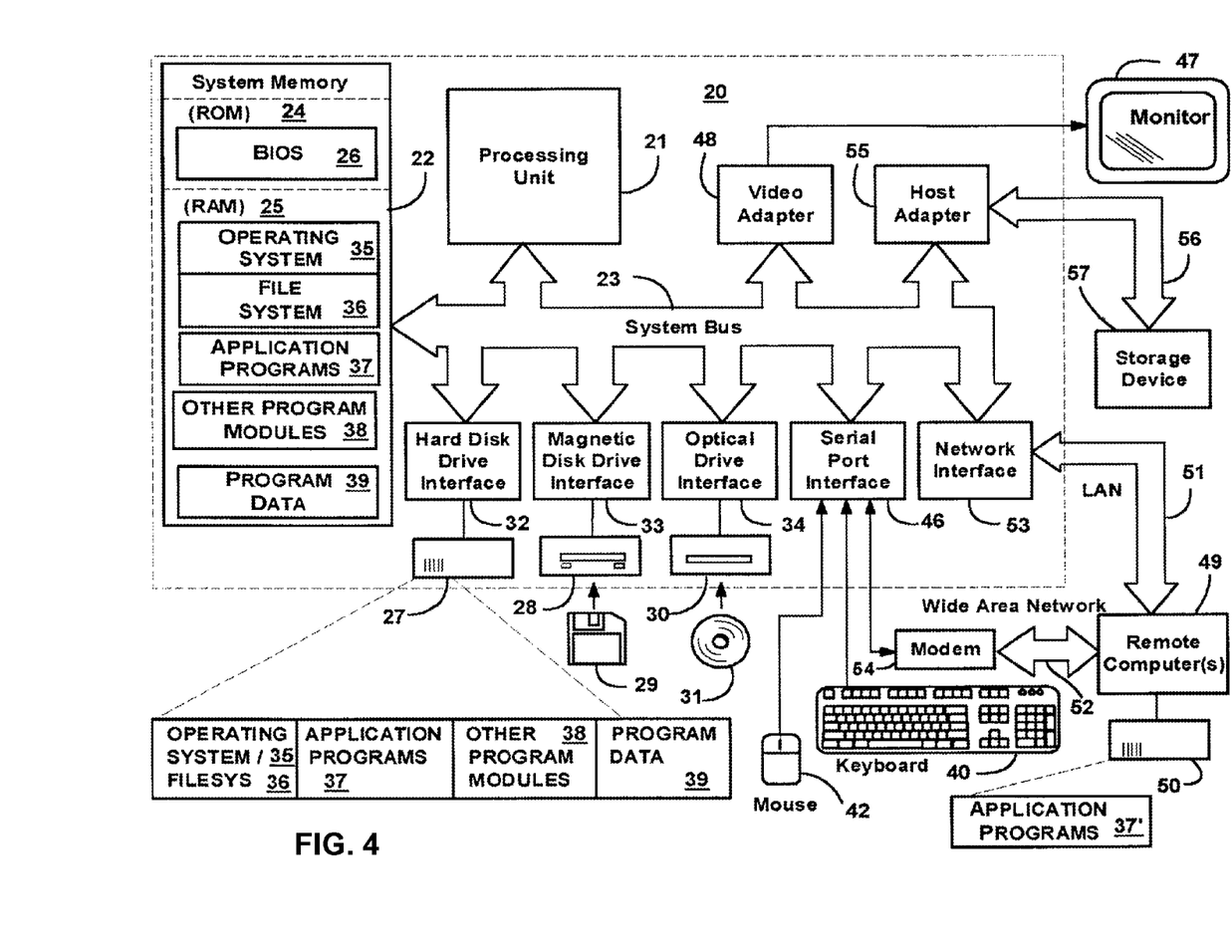
FIG. 4 illustrates a schematic of an exemplary computer system on which the invention can be implemented.

With reference to FIG. 4, an exemplary system for implementing the invention includes a general purpose computing device in the form of a computer or server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Note that the exemplary embodiment can be implemented on a processor of a digital camera or a cell phone. These devices have sufficient memory and can perform calculations needed for implementing the proposed method.

Having thus described a preferred embodiment, it should be apparent to those skilled in the art that certain advantages of the described method and apparatus have been achieved. In particular, those skilled in the art would appreciate that the proposed system and method provide for an effective automated identification of coordinates of facial features in digital images.

It should also be appreciated that various modifications, adaptations and alternative embodiments thereof may be made within the scope and spirit of the present invention. The invention is further defined by the following claims.

What is claimed is:

1. A computer-implemented method for training a facial feature detector, the method comprising:
 (a) generating a grid for an image containing a facial image, the grid including a plurality of locations each corresponding to a facial feature of a plurality of facial features within the facial image;
 (b) overlaying the grid over the image;
 (c) reducing lighting effects;
 (d) extracting feature vectors from the image;
 (e) generating descriptors based on the feature vectors, each descriptor being obtained by increasing a dimensionality of a corresponding feature vector of the feature vectors;
 (f) for each facial feature of the plurality of facial features, adding a first portion of the descriptors to a Positive data array, the descriptors of the first portion each having a coordinate corresponding to a location of the each facial feature within the facial image and adding a second portion of the descriptors to an All data array, the descriptors of the second portion each having a coordinate in the facial image not corresponding to the location of the each facial feature;
 (g) for each facial feature of the plurality of facial features, calculating weights for the descriptors according to the All data array and Positive data array to which the descriptors were added with respect to the each facial feature in (f);

(h) for each facial feature of the plurality of facial features, generating a detector including the descriptors corresponding to the each facial feature and the weights thereof and calculating minimum and maximum values of the detector in a neighborhood of the each facial feature;

(i) for each facial feature of the plurality of facial features, identifying points in the facial image with high value of the detector corresponding to the each facial feature and that do not belong to the each facial feature;

(j) for each facial feature of the plurality of facial features, adding descriptors extracted at the identified points from (i) to the All data array for the each facial feature; and (k) for each facial feature, recalculating weights for the features descriptors of the detector corresponding to the each facial feature based on the Positive and All data arrays corresponding to the each facial feature.

2. The method of claim 1, wherein the grid represents a face.

3. The method of claim 2, wherein the feature vector contains complete data related to the point of the image at given coordinates.

4. The method of claim 1, wherein the facial feature detectors are based on a weight of a particular feature.

5. The method of claim 1, wherein the weights of the features are selected through a process of machine learning.

6. The method of claim 1, wherein the descriptors are added to the All array one-by-one and an array counter is increased by one with each addition.

7. The method of claim 1, wherein the points are added to the Positive array one-by-one, if coordinates of the point are within a range of the facial feature coordinates.

8. The method of claim 1, further comprising repeating steps (a)-(k) for other images containing facial images.

9. A system for training a facial feature detector, the system comprising:
   a processor;
   a memory coupled to the processor;
   a computer program logic stored in the memory and executed on the processor for implementing steps (a)-(k) of claim 1.

* * * * *